Patented Feb. 28, 1939

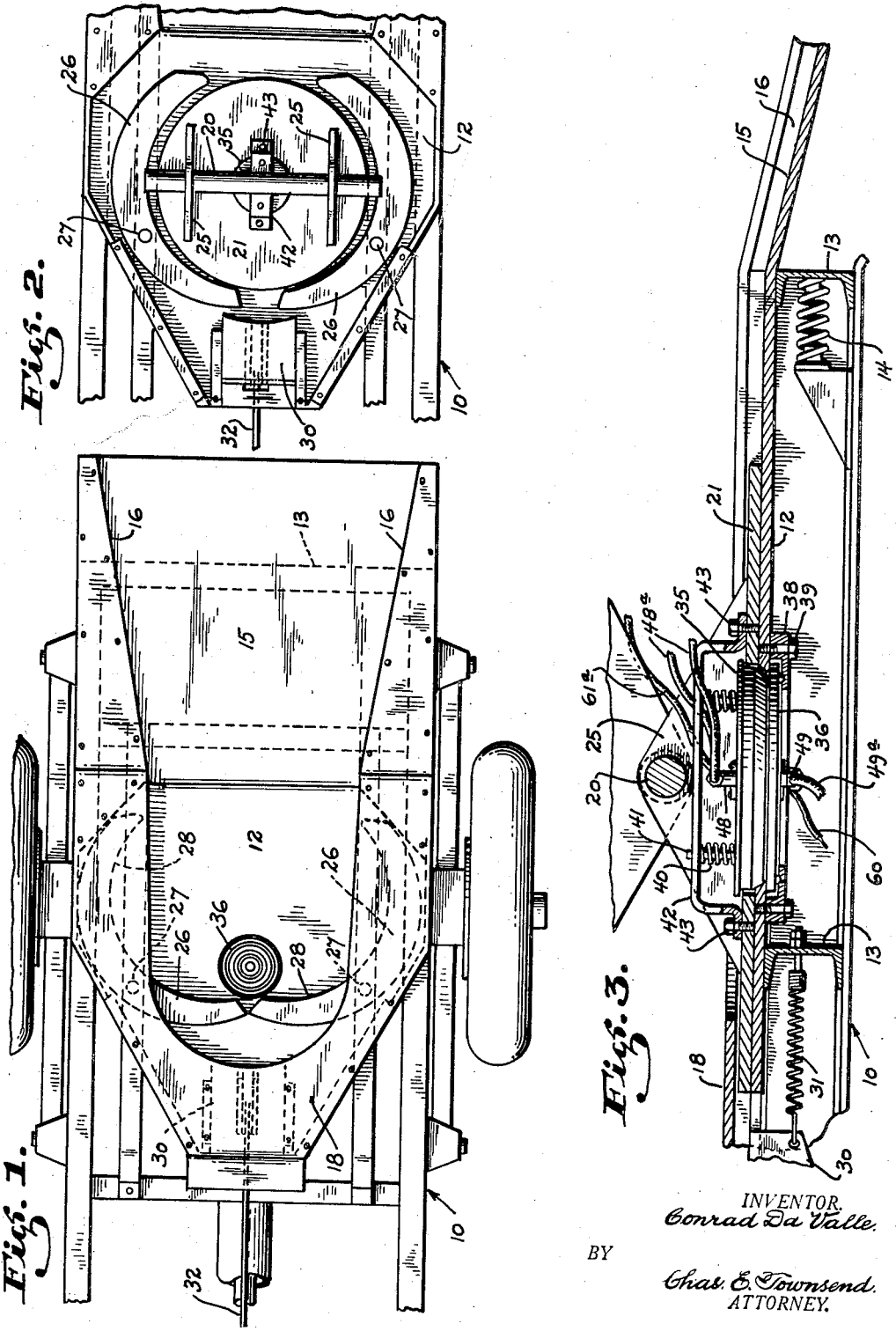

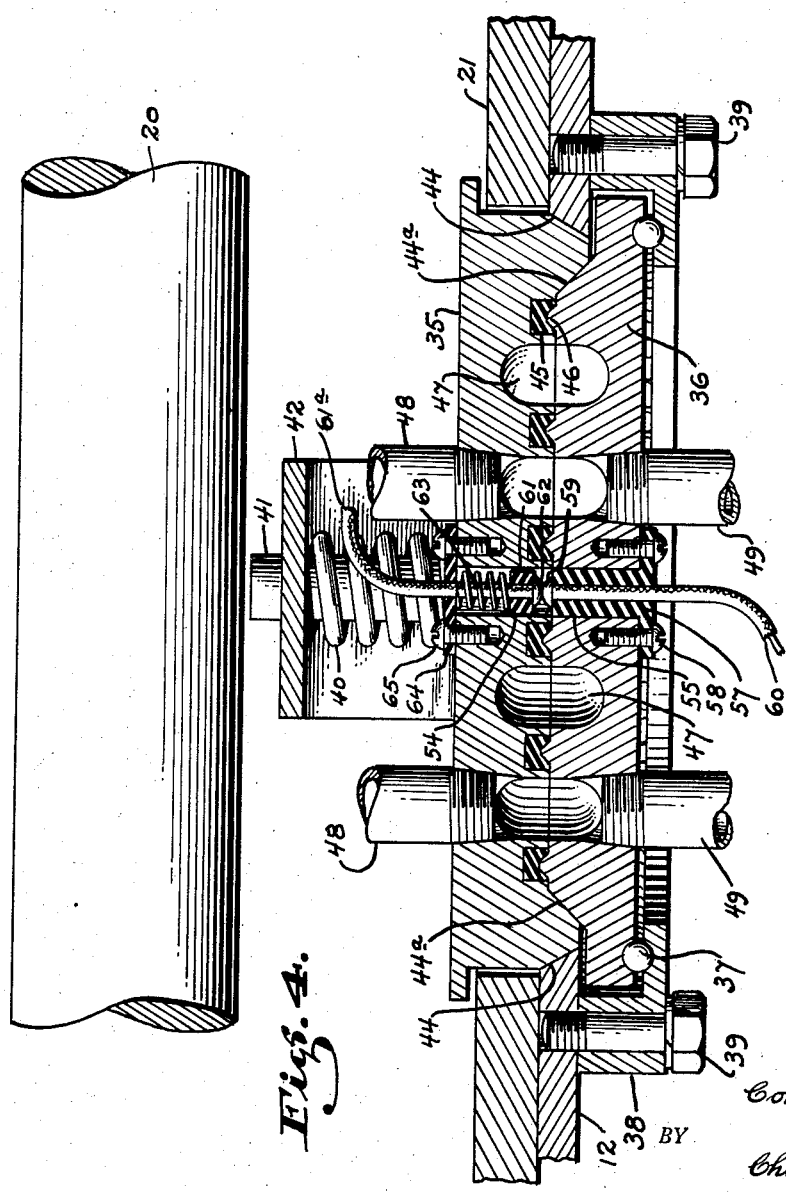

2,148,901

UNITED STATES PATENT OFFICE 2,148,901

AUTOMATIC HOSE COUPLER

Conrad Da Valle, Oakland, Calif.

Original application August 5, 1935, Serial No. 34,710, now Patent No. 2,108,307, dated February 15, 1938. Divided and this application February 1, 1937, Serial No. 123,389

5 Claims. (Cl. 285—21)

This invention relates to hose couplers and particularly to hose couplers that are adapted to form a connection between a truck and trailer using a trailer coupler of the general type disclosed in my Patent No. 2,108,307, which issued February 15, 1938, from a co-pending application entitled "Trailer coupler", filed August 5, 1935, Serial No. 34,710, of which the present application is a division.

It is the object of the present invention to provide a hose coupler that will automatically bring into operative relationship the vacuum or pressure hoses used on trucks and trailers or other traction units when the units are coupled together, in an efficient and dependable manner.

A further object of the invention is the construction of a hose coupler that is precise and dependable in its operation, yet so arranged in a truck and trailer coupler that it is adequately protected against damage due to the shock of rapid coupling and uncoupling operations.

A still further object of the invention is the inclusion in an automatic hose coupler of a novel device for coupling electric circuits automatically and coincidentally with the coupling of the air lines.

Further objects and advantages of the invention will be made apparent in the following specification wherein reference is made to the accompanying drawings illustrating a preferred form of the invention.

In the drawings—

Fig. 1 is a plan view of the rear end of a truck showing a trailer coupling mechanism thereon, and an automatic hose coupler constructed in accordance with my invention;

Fig. 2 is a similar view of the trailer coupler, but showing the fifth wheel of a trailer moving into coupled position;

Fig. 3 is an enlarged view in section of a portion of the coupling mechanism showing the manner in which the hose coupler cooperates therewith; and Fig. 4 is an enlarged vertical section of the hose coupler itself.

In Fig. 1, the rear end of a truck chassis is illustrated at 10. This chassis is provided with a flat coupler plate 12 supported by a frame 13 (see Fig. 3) which may slide relative to the truck chassis, being centralized thereon by shock absorbing springs 14. A back apron 15 having upwardly bent side flanges 16 extends between the top of the plate 12 and the rear of the chassis. A cover plate 18 overlies a portion of the plate 12. The forward end of the trailer frame, which is not illustrated in the present drawings but which is clearly shown and described in my co-pending application above referred to, carries a transverse bar 20 (see Fig. 2) which supports for pivotal movement a trailer fifth wheel 21 by means of brackets 25 extending upwardly from its top surface. The fifth wheel 21 is supported in such a position by the trailer that when the truck is backed toward the trailer, the fifth wheel engages the apron 15, slides up the apron, and comes to rest centrally of the plate 12. A pair of arcuate jaws 26 are pivoted to the plate 12 by pins shown in dotted lines at 27 and are provided with inner curved edges 28 of the same radius as the periphery of the fifth wheel 21. The jaws 26 normally occupy the position illustrated in Fig. 1, but upon movement of the fifth wheel into its coupled position, it strikes the inner edges of the jaws and moves them as illustrated in Fig. 2 toward a closed position. A latch 30 is urged by a spring 31 to a position between the forward ends of the jaws to prevent the removal of the fifth wheel. A rod 32 connected with this latch may extend forwardly to the driver's compartment of the truck where it may be manipulated to withdraw the latch from its position between the jaws for the purpose of releasing the trailer.

All of the mechanism set forth in the general description above is clearly described in my copending application hereinbefore referred to. In said application, there is also described in detail the workings of a vacuum brake system on the truck and trailer and automatic means for setting the brakes of the trailer when it is disengaged from the truck. The particular brake system used on the truck trailer forms no part of the present invention, and it is to be understood that vacuum and pressure brake systems are considered equivalents from the point of view of the present application, as the present invention has to do with the automatic connection of the brake systems of the truck and trailer, and is equally well adapted to either type of brake system.

In order that the coupling and the uncoupling operations may be entirely automatic, the present invention provides the following mechanism for connecting vacuum or pressure lines of the truck and trailer as well as the electric lighting circuits of the two. The fifth wheel 21 of the trailer and the plate 12 of the truck upon which it rests are centrally perforated to receive disk-shaped coupling members 35 and 36 respectively. The member 36 on the truck is supported for turning movement, as illustrated in Figs. 3 and 4, on ball bearings 37, a race for which is formed in an annular bracket 38 of angular cross-section secured to the bottom of the plate 12 by bolts 39. The coupling member 35 on the fifth wheel is urged downwardly by springs 40 which surround pins 41 guided for vertical movement through a bracket 42 which spans the opening in the fifth wheel occupied by the coupling member and is secured at its ends to the fifth wheel by bolts 43. The lower outer edge of the disk-like member 35 extends downwardly to protect the greater area of the bottom surface of this member and is beveled as at 44 so that as the fifth wheel rides over the plate 12 to the position where the coupling members register with each other, the disk 35 will be pressed downwardly by the springs 40 into close contact with the lower coupling member 36. The edges of the opening in the plate 12 are similarly beveled to assist in centering the member 35 with relation to the member 36, and for the further purpose of facilitating separation of these members by causing the member 35 to ride out of the perforation in which it seats when the truck and trailer are uncoupled and drawn apart. Complementary beveled surfaces are formed on the disks 35 and 36 to register with each other as illustrated at 44a to insure exact centering of the disks with relation to each other.

The contacting faces of the coupling members 35 and 36 are provided with complementary imbedded gaskets 45, ridges 46 and annular grooves 47 to form separate sealed concentric annular chambers through which the vacuum or pressure connections of the brake systems may be connected. The gaskets 45 are of rubber or other material suitable for forming an air-tight joint. Fittings 48 communicate with these chambers through the coupling member 35 and with flexible conduits 48a leading to the trailer vacuum system; similar fittings 49 communicate with the grooves 47 and with suitable conduits 49a leading to the brake system of the truck. The conduits in both cases are sufficiently flexible so that free swinging movement of the fifth wheel is permitted and slight rotary movement of the coupling member 36 on its bearings 37 will be possible, as is necessary to permit the coupled truck and trailer to round a corner.

The coupling member just described is so constructed that it will form perfectly tight fluid connections between the brake systems of the truck and trailer, and is formed of accurately machined relatively delicately constructed parts, these parts being adequately protected against undue shock because of the manner in which the upper disk 35 is supported and constructed. When the disk 35 rides over the plate 12, its lower outer edges support it in a position preventing any contact of its bottom face with the plate 12 which would cause destruction of the gaskets and finely machined parts thereof. At the same time, the beveled edges 44 and 44a of this disk permit it to be snapped into perfectly registering position with the disk 36 at the instant that the coupling operation of the truck and trailer is completed.

In order to form a connection between the electric lighting system of the truck and the electric system of the trailer, the coupling members 35 and 36 are provided with centrally positioned aligned holes 54 and 55, respectively, to receive electric contact members which are brought into contact with each other during the coupling operation. The hole 55 contains a dielectric plug 57 which may be secured in place by screws 58 passing through a bottom flange thereon, and which supports a contact member 59 connected by a wire 60 with the lighting circuit of the truck. The hole 54 contains a slidable dielectric plunger 61 which supports a contact member 62 in a position to engage the contact member 59. A spring 63 is interposed between the back of the plunger 61 and a cover 64 secured over the top of the hole 54 by means of screws 65. This spring urges the contact member 63 downwardly into firm engagement with the member 59. A wire 61a forms a connection between the contact member 62 and the lighting circuit of the trailer.

The electrical connection here shown is designed for a single wire lighting circuit where a ground is made throughout the framework of the truck and trailer. The same principles may be employed, however, for a multiple wire connection simply by replacing the contact members 59 and 62 by conventional concentrically spaced annular contact members.

The resiliently mounted contact member 62, being carried by the upper disk 35, is protected from damage in the coupling and uncoupling operation in the same manner as the gaskets 45 by means of the downwardly projecting annulus on the bottom of the disk.

While certain features of the present invention are more or less specifically described, it is to be understood that various changes may be made in the construction and arrangement of the several parts thereof within the spirit and scope of the appended claims.

Having thus described my invention, what I claim and desire to secure by Letters Patent is—

1. For combination with a trailer coupler comprising a fifth wheel on a trailer and a plate on the truck over which the fifth wheel slides to its coupled position, a hose coupling comprising a disk on the truck supported in a recess in said plate and a complementary disk on the fifth wheel resiliently supported and urged to enter the said recess when aligned therewith.

2. For combination with a trailer coupler comprising a fifth wheel on a trailer and a plate on the truck over which the fifth wheel slides to its coupled position, a hose coupling comprising a disk rotatably mounted in a recess in said plate, a complementary disk carried by the fifth wheel of the trailer and resiliently urged toward the first disk, and beveled edges on said disks and said recess to facilitate insertion and registry of the disks when they are brought into alignment and to cause them to move out of registry when the truck and trailer are drawn apart.

3. A hose coupling comprising a pair of disks having registering faces with complementary annular concentric grooves to form spaced fluid chambers, annular sealing members adjacent said grooves, a flat plate having an opening formed therein, means supporting one of said disks behind said opening, means supporting the other disk to slide over said plate, a marginal projection on said other disk engaging said plate and protecting the sealing members from contact with the plate, said projection fitting within the plate opening to permit the registering faces of the disks to come together.

4. In a hose coupling, a flat plate having an opening formed therein, a pair of disks having registering faces with complementary grooves and sealing means, means for rotatably supporting one of said disks behind the opening in said flat plate, the other disk being slidable over said plate, and means for urging the disks together when the said other disk registers with the opening in the plate.

5. A hose coupling comprising a pair of relatively slidable plates, complementary coupling disks mounted one on each of said plates, one of said plates having an annular opening concentric with the disk mounted upon it, said opening having a beveled edge, the disk on the other plate having a beveled annular projection fitting said opening when the disks are brought together.

CONRAD DA VALLE.